United States Patent [19]

Coulon

[11] Patent Number: 4,608,853

[45] Date of Patent: Sep. 2, 1986

[54] PERCUSSION APPARATUS

[75] Inventor: André Coulon, Bessoncourt, France

[73] Assignee: Alsthom-Atlantique, Paris, France

[21] Appl. No.: 699,112

[22] Filed: Feb. 7, 1985

[30] Foreign Application Priority Data

Feb. 7, 1984 [FR] France .................................. 8401843

[51] Int. Cl.$^4$ ............................................. B21D 31/06
[52] U.S. Cl. ......................................... 72/434; 72/75; 30/367; 29/90 A
[58] Field of Search ...................... 72/75, 76, 246, 433, 72/434, 465, 53; 81/20, 21; 29/81 D, 90 A; 30/358, 361, 362, 366, 367; 73/82, 85; 267/137

[56] References Cited

U.S. PATENT DOCUMENTS 1,784,866 12/1930 Fahrenwald ........................... 72/326
3,159,025 12/1964 Pais ....................................... 30/358

FOREIGN PATENT DOCUMENTS 0012425 6/1980 European Pat. Off. .............. 72/433
0251913 5/1926 United Kingdom ............... 29/81 D Primary Examiner—Lowell A. Larson
Attorney, Agent, or Firm—Sughrue, Mion, Zinn, Macpeak, and Seas

[57] ABSTRACT

Percussion apparatus having a compressed air inlet (3) and serving to impart percussive movement to a tool (10), the said tool (10) sliding inside an envelope (1) fixed to the apparatus and being terminated by a spherical portion (22), includes the improvement wherein the said tool (10) includes a hollow tube (13) with one end (21) holding a ball (22) captive, which ball is urged against the end (21) by a spring (24) lodged in the tube (13). When the ball (22) is worn, it is easily changed.

4 Claims, 1 Drawing Figure

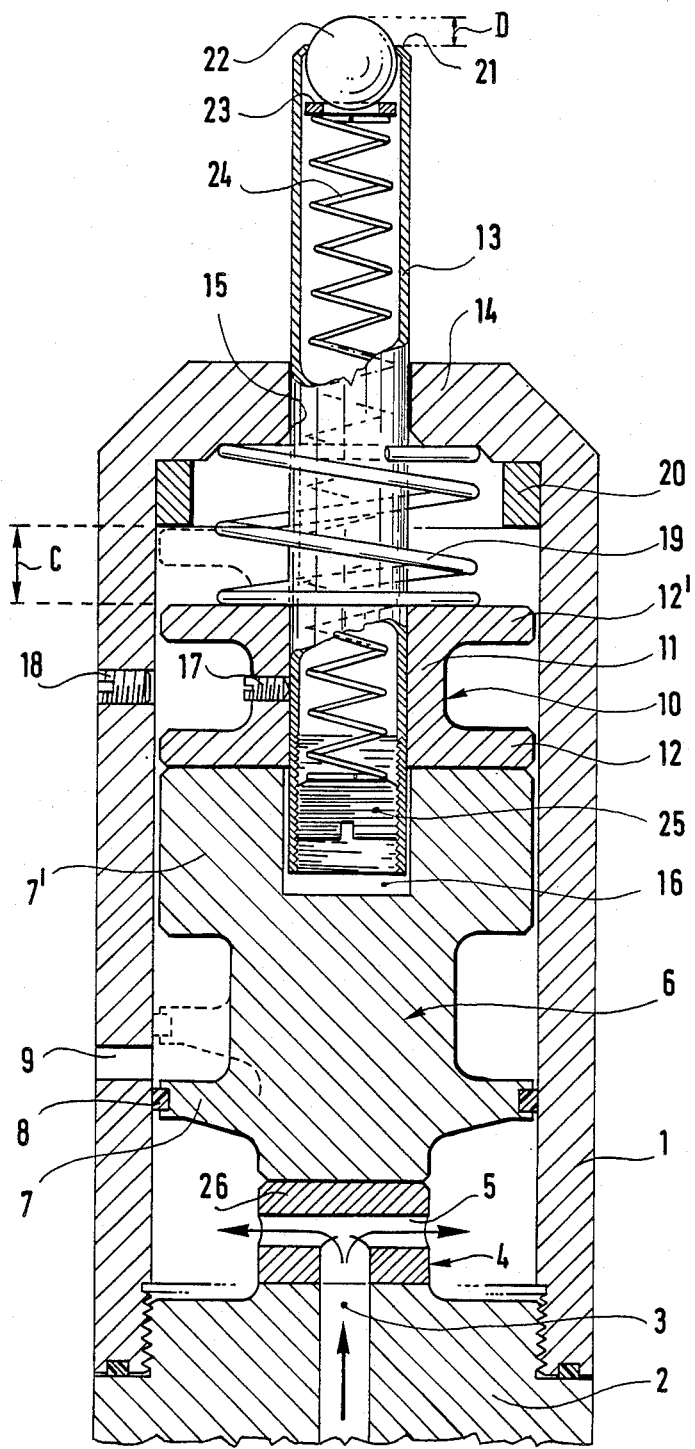

PERCUSSION APPARATUS

The present invention relates to a percussion apparatus having a compressed air inlet and serving to impart a percussive movement to a tool, the said tool sliding inside an envelope fixed to the apparatus and being terminated by a spherical portion.

BACKGROUND OF THE INVENTION

Such an apparatus is disclosed in published French patent application No. 2 444 719. It may be used, for example, for localized cold working the surface of steel in order harden it.

In this prior apparatus, the percussion tool is in a single block and when the spherical end becomes worn, the entire tool must be replaced which is expensive since such a tool requires special fabrication. Further, this apparatus provides considerable recoil in use which makes it difficult to handle.

SUMMARY OF THE INVENTION

The apparatus according to the invention includes the improvement whereby the said tool includes a hollow tube with one end holding a ball captive, which ball is urged against said end by a spring lodged in the tube.

Thus, the only portion which is subjected to wear is a steel ball that is easily obtained commercially.

In addition, the recoil of the apparatus is reduced because the ball is received into the tube on each stroke.

According to an improvement of the invention, the end of the tube opposite from the ball includes a position-adjustable stopper to compress the spring against the ball to a greater or lesser extent.

BRIEF DESCRIPTION OF THE DRAWING

An embodiment of the invention is now described in detail by way of example with reference to a the sole FIGURE of the accompanying drawing, which is a longitudinal section through a percussive apparatus in accordance with the invention.

MORE DETAILED DESCRIPTION

The apparatus in accordance with the invention comprises a hollow cylindrical envelope or body 1 having a circular orifice 15 at its top 14. The envelope 1 is fixed to the head 2 of a pistol supplying compressed air via an air inlet duct 3.

A compressed air nozzle 4 is fixed to the compressed air inlet duct 3 and has two sideways-directed cross-shaped slots 5 and a top face 26 serving as a stop for a piston 6.

The piston 6 has two portions 7, 7' of larger diameter which slide in the envelope 1. The portion 7 of larger diameter which is closer to the nozzle 4 is provided with a piston ring 8.

Holes 9 are provided through the envelope or body 1 and serve to eject air when the piston 6 is at the end of its stroke (away from the nozzle 4). The tool 10 is placed on the piston 6 and is constituted by a cylindrical part 11 having two portions 12, 12' of greater diameter slidably mounted inside the envelope. It further has a hollow tube 13 disposed in an axial bore in the part 11. The tube 13 projects through the circular orifice 15 of the envelope or body 1 and extends beyond the top 14 of the envelope 1.

The tube 13 also projects a little way below the part 11 and is received in an axial housing or recess 16 provided in the end of piston 6.

The tube 13 is fixed to the part 11 by a screw 17 which may be screwed from the outside via a subsequently closed opening 18 through the envelope 1.

The part 11 is urged away from the top 14 by a spring 19 disposed between the top 14 and part 11. A stop 20 in the form of a ring also disposed against the top 14 limits the stroke of the part 11.

The end 21 of the tube 13 slopes inwardly and holds captive a steel ball 22 a portion of which projects a distance D beyond said end 21.

The ball 22 rests on a washer 23 which is urged forwardly by a spring 24 bearing against a stopper 25 which is screwed into the bottom of tube 13.

The force of the spring 24 on the ball 22 is adjusted by the degree to which the stopper 25 is screwed in.

The distance between the part 11 and the stop 20 represents the maximum stroke C of the tool 10.

The distance D represents the maximum amount by which the ball 22 can be pushed into the tube 13.

In general, in order to treat a surface, the pistol 2 is disposed perpendicularly to the surface with the ball 22 pointing down and in contact with the surface. The spring 19 is thus selected and the spring 24 adjusted in such a manner that the ball 22 is not pushed into the tube 13 by the distance D since that could damage the end 21 of the tube 13.

The pistol recoils by a distance C-D (neglecting the distance to which the ball sinks into the metal) rather by a distance C as with the prior pistol, thereby considerably facilitating use.

When the ball 22 is worn, the screw 17 is unscrewed to release the tube 13 so that it can be completely removed from the envelope 1.

The stopper 25 is then unscrewed and a new ball 22 is inserted in the tube 13.

The tube 13 is then put back. The ball is made of very hard steel and its diameter is greater than 2 mm, and is preferably 6 mm to 8 mm to provide good surface treatment.

I claim:

1. In a percussion apparatus having a hollow body, a tool axially slidable in said body, and having a projection extending axially outside of said body at one end thereof, and a compressed air inlet and means responsive to compressed air to impart percussive movement of said tool and to drive said projection outwardly of said body, a first spring interposed between said body and said tool for biasing said tool in a direction to retract the projection into said body, the improvement wherein said tool projection comprises a hollow tube having one end slidably projectable from the end of said hollow body, a ball within said hollow tube, said one end of said tube forming an opening smaller than the diameter of said ball and holding said ball captive with said ball forming said spherical portion and partially projectable outwardly of said tube at said opening, and a second spring lodged in the tube and abutting said ball for urging said ball against said tube one end and extending parallel with said first spring and stop means within said body limiting percussive movement of said tool against the bias of said first spring means to a distance C, and the projection of said ball through said tube opening by said second spring being of a distance D smaller than that of C, whereby said percussion apparatus recoil is of a distance C-D for reducing fatigue of the percussion apparatus operator during apparatus operation.

2. The percussion apparatus as claimed in claim 1, wherein a cylindrical piston is in axial end abutment with the end of the tool remote from the ball carried by said tube, said tool includes a cylindrical part slidably mounted within said hollow body, said tube is fixed to said cylindrical part, and has two portions projecting from said cylindrical part in opposite directions, and wherein said piston includes an axial recess within the end contacting said tool cylindrical part and receiving a projecting end of said tube, and wherein said first spring comprises a coil spring concentrically surrounding said tube and interposed between said body and the end of said cylindrical part remote from said piston, and said second spring comprises a coil spring internally of said tube and having one end in contact with the stopper threaded into the projecting end of said tube received by said piston axial recess and having its opposite end in operative engagement with the ball and normally causing a portion of the ball to project from the opening within the end of the hollow tube.

3. Percussion apparatus according to claim 1, wherein the end of the tube opposite from the ball includes a position-adjustable stopper abutting the end of the second spring opposite that in abutment with the ball compress the spring against the ball to a greater or lesser extent; whereby, the spring biasing force of the second spring may be adjusted relative to the given spring constant of the first spring to insure that the ball is not pushed into the tube by the full distance D to prevent damage to the end of the tube bearing said ball, during apparatus operation.

4. The percussion apparatus as claimed in claim 2, wherein a cylindrical piston is in axial end abutment with the end of the tool remote from the ball carried by said tube, said tool includes a cylindrical part slidably mounted within said hollow body, said tube is fixed to said cylindrical part, and has two portions projecting from said cylindrical part in opposite directions, and wherein said piston includes an axial recess within the end contacting said tool cylindrical part and receiving a projecting end of said tube, and wherein said first spring comprises a coil spring concentrically surrounding said tube and interposed between said body and the end of said cylindrical part remote from said piston, and said second spring comprises a coil spring internally of said tube and having one end in contact with the stopper threaded into the projecting end of said tube received by said piston axial recess and having its opposite end in operative engagement with the ball and normally causing a portion of the ball to project from the opening within the end of the hollow tube.

* * * * *